US007990561B2

(12) United States Patent
Okabe

(10) Patent No.: US 7,990,561 B2
(45) Date of Patent: Aug. 2, 2011

(54) IMAGE PROCESSING SERVER, IMAGE PROCESSING METHOD, AND COMPUTER READABLE STORAGE MEDIUM

(75) Inventor: Kouya Okabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 555 days.

(21) Appl. No.: 12/172,662

(22) Filed: Jul. 14, 2008

(65) Prior Publication Data

US 2009/0021785 A1    Jan. 22, 2009

(30) Foreign Application Priority Data

Jul. 19, 2007    (JP) ................. 2007-188639

(51) Int. Cl.
*G06F 3/12* (2006.01)
*G06K 15/02* (2006.01)
*G06K 9/20* (2006.01)
*G06K 7/10* (2006.01)

(52) U.S. Cl. ............ 358/1.15; 358/1.11; 358/1.16; 358/2.1; 358/462; 382/176; 382/229; 382/317; 382/321

(58) Field of Classification Search .......... 358/1.11, 358/1.15, 1.16, 1.17, 2.1, 462; 382/176, 382/177, 229, 305, 317, 321, 322, 323, 324
See application file for complete search history.

(56) References Cited

U.S. PATENT DOCUMENTS

| 5,907,835 A | 5/1999 | Yokomizo et al. ............... 707/1 |
| 2003/0168513 A1* | 9/2003 | Fitzgibbons et al. ..... 235/462.01 |
| 2006/0007481 A1* | 1/2006 | Kato et al. .................. 358/1.15 |
| 2006/0170960 A1* | 8/2006 | Koike .......................... 358/1.15 |
| 2007/0146791 A1* | 6/2007 | Murase ........................ 358/1.16 |

FOREIGN PATENT DOCUMENTS

| JP | 8-147446 | 6/1996 |
| JP | 8-161467 | 6/1996 |
| JP | 8-212331 | 8/1996 |

* cited by examiner

*Primary Examiner* — Charlotte M Baker
*Assistant Examiner* — Aaron R Gerger
(74) *Attorney, Agent, or Firm* — Fitzpatrick, Cella, Harper & Scinto

(57) ABSTRACT

The present invention decides whether an OCR processing is necessary or not for a printing job by using a difference between text data extracted by performing the OCR processing on an image generated based on a previous printing job having been processed previously and text data extracted from text drawing command of the previous printing job having been processed previously. If the OCR processing is decided to be unnecessary, the text data extracted from the text drawing command of the printing job is registered in a database for retrieving an image data. If the OCR processing is decided to be necessary, text data extracted by performing OCR processing on the image data generated based on the drawing commands of the printing job and the text data extracted from the text drawing command of the printing job are registered in a database for retrieving an image data.

8 Claims, 10 Drawing Sheets

| I D | APPLICATION NAME | NUMBER OF CHARACTERS | NUMBER OF PAGES | FILE SIZE |
|---|---|---|---|---|
| 00000001 | WINWORD.EXE | 23087 | 85 | 12000 KB |
| 00000002 | Acrobat.exe | 23 | 50 | 5500 KB |
| 00000003 | POWERPNT.EXE | 612 | 10 | 762 KB |

FIG.7

IMAGE PROCESSING SERVER, IMAGE PROCESSING METHOD, AND COMPUTER READABLE STORAGE MEDIUM

BACKGROUND OF THE INVENTION

1. Field of the Invention

The present invention relates to an image processing server, an image processing method, and a computer readable storage medium.

2. Description of Related Art

Recently, problems of secret information leakage in businesses have occurred frequently. As a background of the problems, the fact can be cited that, as printers or digital multifunction printers have spread, anybody can print, copy or transmit an original document easily. Although it improves convenience, it is considered to bring about a problem of information leakage such as printing, copying and transmission of secret documents. To deal with this problem, a method is conceivable that stores in a storage device all data such as image data, text data and log information, like when, where and by whom documents are read by a printer or digital multifunction printer during a job, and that can retrieve this data. This makes it possible to track the way information leakage takes place, and as a result to deter information leakage.

To enable such a system to search for a job, it is necessary to extract the text data of the job, and to associate it with the image data and log information. As a related art, there is a system that executes a filing driver for electronic filing, extracts information for a keyword search from drawing information, and records it as a keyword (see Japanese Patent Laid-Open No. 8-147446, for example). In addition, there is a system that generates text information by extracting a character code from a drawing code of a document created by prescribed application software, and records it in connection with a document image in a database (see Japanese Patent Laid-Open No. 8-212331, for example). Furthermore, there is a system that extracts character information by performing OCR processing (optical character recognition processing) of image data, and records it in connection with a document image in a database (see, Japanese Patent Laid-Open No. 8-161467 and Japanese Patent Laid-Open No. 8-212331, for example).

SUMMARY OF THE INVENTION

In the foregoing conventional arts, however, the extracting methods of the text data are fixed, or fixed in accordance with a file format.

According to the present invention, to extract image data, text data, and log information of a printing job, a printer driver extracts these data at the time of executing the job. When a printing drawing command is delivered to the printer driver in the form of a character, image or graphics, the printer driver cannot extract text data unless the file format of the data is known, for example. As for an application having such a printing execution module, a workaround is conceivable in which the printer driver extracts the text data by extracting the image data of the job and by applying the OCR processing to the image data.

This method, however, must carry out the OCR processing without exception unless the "application where the printer driver cannot extract text data" is known in advance. Thus, even for an execution job of an application capable of extracting the text data normally, the OCR processing must be executed every time, which presents a problem of deteriorating the performance. To avoid such a problem, a system administrator checks "applications in which the printer driver cannot extract the text data" and records them, which is laborious work and presents a high possibility of making a mistake.

In view of the foregoing facts, a technique is required in which the system automatically checks each application as to whether the printer driver can extract characters accurately, and automatically switches the extracting method of the text data.

To solve the foregoing problem, an image processing server in accordance with the present invention comprises: OCR necessity deciding unit that makes a decision as to whether OCR processing is necessary or not for image data generated in accordance with drawing commands of a printing job; first data registering unit that registers, when the OCR necessity deciding unit decides that the OCR processing is unnecessary, text data extracted from a text drawing command of the printing job to a database as text data for retrieving the image data; OCR unit that extracts, when the OCR necessity deciding unit decides that the OCR processing is necessary, text data by performing OCR processing on the image data generated in accordance with the drawing commands of the printing job; and second data registering unit that registers, when the OCR necessity deciding unit decides that the OCR processing is necessary, the text data extracted by the OCR unit and the text data extracted from the text drawing command of the printing job to the database as the text data for retrieving the image data, wherein the OCR necessity deciding unit makes a decision as to whether the OCR processing is necessary or not for the printing job in accordance with difference between text data generated by performing the OCR processing on an image generated based on a previous printing job having been processed previously and text data extracted from text drawing command of the previous printing job having been processed previously.

According to the present invention, it becomes possible for the system that stores in the server the contents data of the job of a printer together with log information to extract the text data at high accuracy without executing unnecessary OCR processing. This enables improvement in the performance in the data registering processing. Alternatively, by setting not to extract the image data when a decision is made that a printer driver extracts characters accurately, further improvement in the performance in the data registering processing and reduction in the capacity of the database are achieved. Besides, it becomes unnecessary for a system administrator to check manually "applications in which the printer driver cannot extract the text data", which leads to improvement in the convenience of a user.

Further features of the present invention will become apparent from the following description of exemplary embodiments (with reference to the attached drawings).

BRIEF DESCRIPTION OF THE DRAWINGS

FIG. 7 is a diagram showing an example of a table for storing differences in the number of characters of respective printing execution module names in a database server 104;

DESCRIPTION OF THE EMBODIMENTS

The invention will now be described with reference to the accompanying drawings.

Embodiment 1

Figure 1:
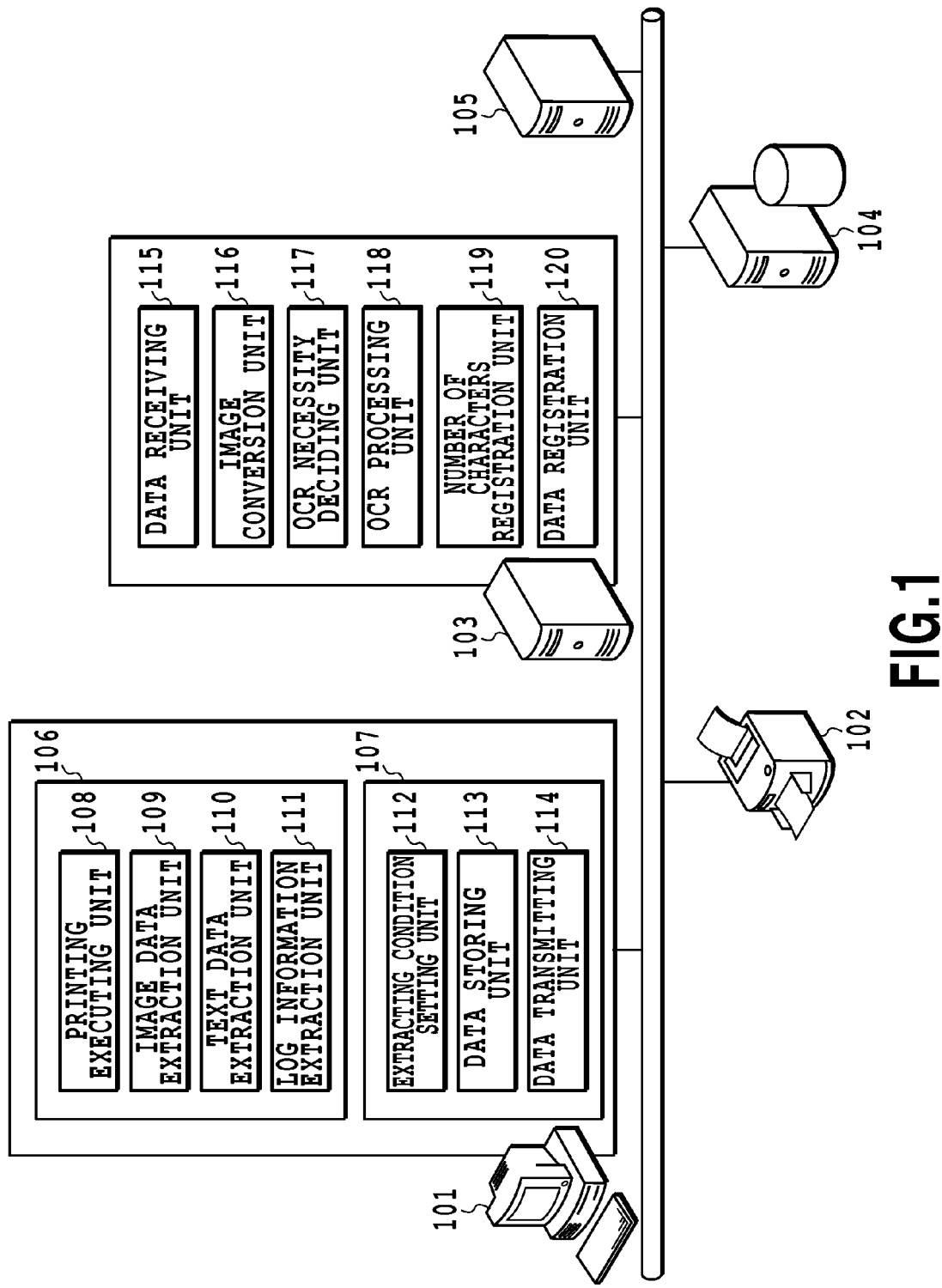
FIG. 1 is a block diagram showing an overall configuration of a network document management system of an embodiment in accordance with the present invention.

FIG. 1 is a block diagram showing a configuration of a first embodiment of a network document management system in accordance with the present invention. In FIG. 1, a client PC 101, a printer 102, an image processing server 103, a database server 104, and a system administrator PC 105 are interconnected on a network.

The client PC 101, which is a PC used by the so-called ordinary user, is a PC for performing printing to the printer 102 in the embodiment in accordance with the present invention. Although FIG. 1 shows only one client PC 101, a plurality of client PCs can be connected within the limits of the system.

The client PC 101 has a printer driver 106 and an agent application 107 installed, and implements the individual processing units shown in FIG. 1 by executing them using a CPU of a PC and a memory.

The printer driver 106 has a function of receiving a printing execution command based primarily on a user instruction, and transmits printing data (printing job) to the printer 102, and a function of extracting image data from the printing job. In other words, the printer driver 106 causes the computer to function as a printing executing unit 108, an image data extraction unit 109, a text data extraction unit 110, and a log information extraction unit 111. The printing executing unit 108 receives a printing request of an application, generates a printing command such as a PDL, and transmits a printing command to the printer 102 to make it perform printing processing. The image data extraction unit 109 receives a drawing command from the printing command, and generates an image file with a common format such as BMP and JPEG. The text data extraction unit 110 receives a text drawing command from the printing command, and generates text data. Here, the text data includes character strings to be printed, for example. The log information extraction unit 111 extracts the log information such as "when", "where" and "who". The log information is used for deterring information leakage or unauthorized use of the image data including the log information, for example. The log information extraction unit 111 also extracts a printing execution module name the application that executes the printing employs.

The agent application 107 has a function of setting extracting conditions in the printer driver 106, a function of receiving and storing the image data, text data and log information the printer driver 106 extracts, and a function of transmitting the stored data to the image processing server 103.

Thus, the agent application 107 causes the computer to function as an extracting condition setting unit 112, a data storing unit 113, and a data transmitting unit 114. The extracting condition setting unit 112 sets an object such as an image or text to be extracted by the printer driver 106, the resolution and the number of bits of the image data to be extracted by the image data extraction unit 109, and a quantization coefficient and the like in the case of JPEG. The data storing unit 113 receives the data the image data extraction unit 109, text data extraction unit 110, and log information extraction unit 111 extract, and stores them in the storage device. The data transmitting unit 114 transmits the data stored in the storage device by the data storing unit 113 in the image processing server 103.

The printer 102 carries out printing in accordance with the printing data (printing job) transmitted from the client PC 101.

The image processing server 103 primarily has functions of performing converting processing of the image data received from the client PC 101, OCR processing (optical character recognition processing), and registering processing to the database server 104.

The image processing server 103 functions as a data receiving unit 115, an image conversion unit 116, an OCR necessity deciding unit 117, an OCR processing unit 118, a number of characters registration unit 119, and a data registration unit 120. The present invention can accept a plurality of data registration units. In this case, the plurality of data registration units can be referred to as a first data registration unit, a second data registration unit, third data registration unit, etc. The data receiving unit 115 receives the image data, text data and log data transmitted from the data transmitting unit 114 of the client PC 101. The image conversion unit 116 converts the received image data to a format the OCR processing can execute, and to a format the database server 104 can store. In addition, the image conversion unit 116 also performs the processing for executing OCR processing such as resolution converting processing, rotating processing and skew correction. The OCR necessity deciding unit 117 makes a decision on whether the received image data is to be subjected to the OCR processing to extract the text data. The OCR processing unit 118 performs the OCR processing on the image data and extracts the text data. The number of characters registration unit 119 calculates the difference in the number of characters between the text data the data receiving unit 115 receives and the text data the OCR processing unit 118 extracts, and stores the difference to the database server 104 via a difference storing unit. At the recording, it is recorded in connection with the printing execution module name, and the number of times of the printing performed in the printing execution module name is also recorded at the same time. The data registration unit 120 records in the database server 104 the image data, text data and log data, all the processing of which is executed in the image processing server 103.

The database server 104 is an archive server for storing the image data, text data and log data delivered from the image processing server 103, that is, job tracking information.

The system administrator PC 105 is a PC for retrieving data stored in the database server 104 for tracking a job.

Incidentally, although FIG. 1 shows a system that connects the client PC 101 directly to the printer 102, the client PC 101 can be connected to the printer 102 via a print server. In this case, the individual processing units in the printer driver 106 are installed in the print server, first, for example, and then installed in the client PC 101 using point and print. In addition, the individual processing units in the agent application 107 are installed only in the print server.

Figure 2:
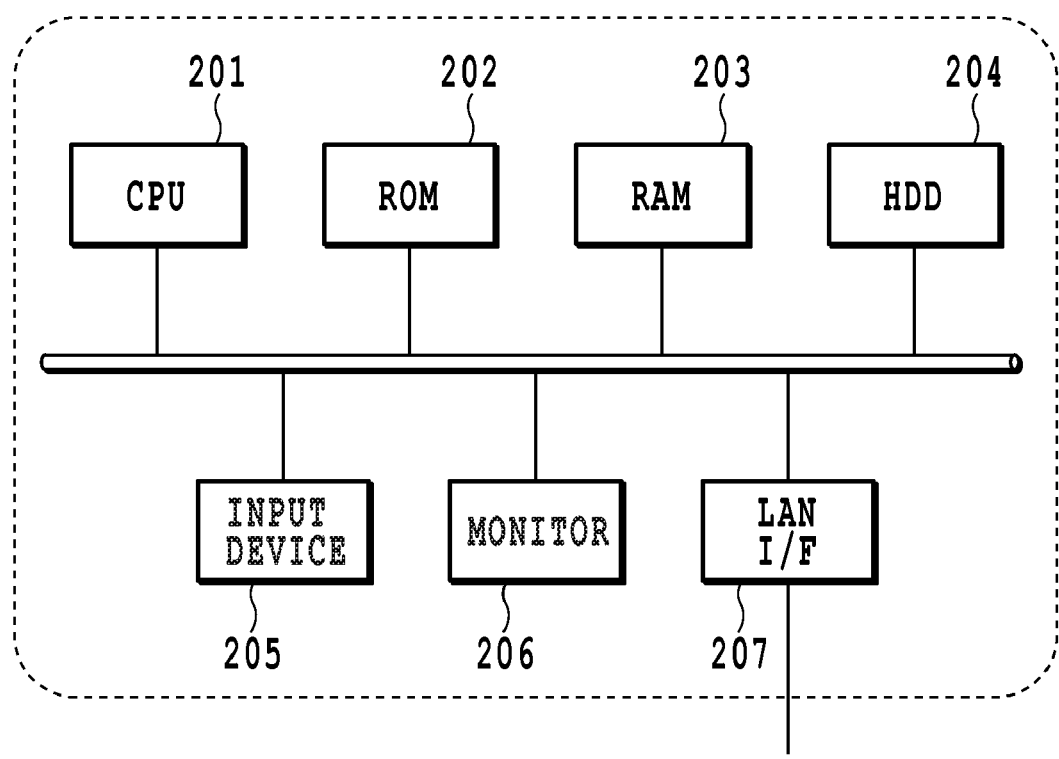
FIG. 2 is a block diagram showing hardware of each of a series of PCs or a server of the system.

FIG. 2 is a block diagram showing hardware of each of the client PC 101, image processing server 103, database server 104, and system administrator PC 105. Each of them has the same block diagram because they each consist of a general-purpose PC like an IBM-PC/AT compatible. A CPU 201 directly or indirectly controls individual devices (such as a ROM and a RAM, which will be described later) connected via an internal bus, and executes programs for implementing the present invention. The ROM 202 stores an operating system such as BIOS. The RAM 203 is used as a work area of the CPU 201, and as a temporary memory for loading a program for implementing the present invention. An HDD (hard disk drive) 204 stores programs in files. An input device 205 is provided for controlling programs having an operation screen in them. A monitor 206 is provided for confirming the operation. A LAN I/F 207 connects external equipment to the network.

Figure 3:
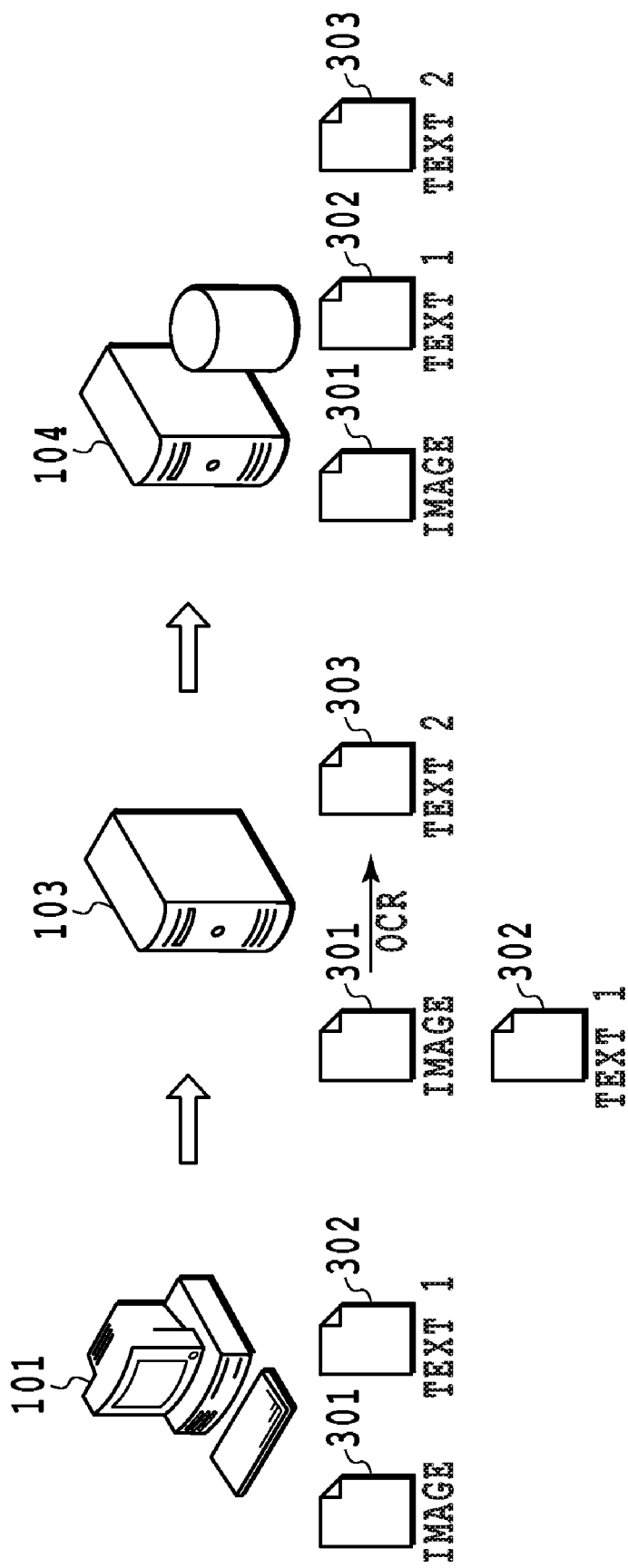
FIG. 3 is a diagram showing a flow of image data and text data individual processing units of FIG. 1 generate when performing OCR processing.

FIG. 3, which is a diagram showing a flow of the image data and text data generated by the individual processing units described in detail in FIG. 1, is a diagram when the image processing server 103 carries out the OCR processing. As for the log information, although it is not shown specifically, it is assumed to be registered to the database server in connection with the text data.

When the client PC 101 executes printing, the image data extraction unit 109 generates the image data 301, and the text data extraction unit 110 generates the text data 302 (text 1). The data transmitting unit 114 transmits these data to the image processing server 103. The image conversion unit 116 of the image processing server 103 performs the image converting processing on the image data 301, and the OCR processing unit 118 applies the OCR processing on the image data 301, thereby generating the text data 303 (text 2). The number of characters registration unit 119 compares the number of characters of the text data 302 (text 1) with that of the text data 303 (text 2), and stores the difference between them to the database server 104 via the difference storing unit. The data registration unit 120 registers the image data 301, text data 302 (text 1) and text data 303 (text 2) to the database server 104.

Figure 4:
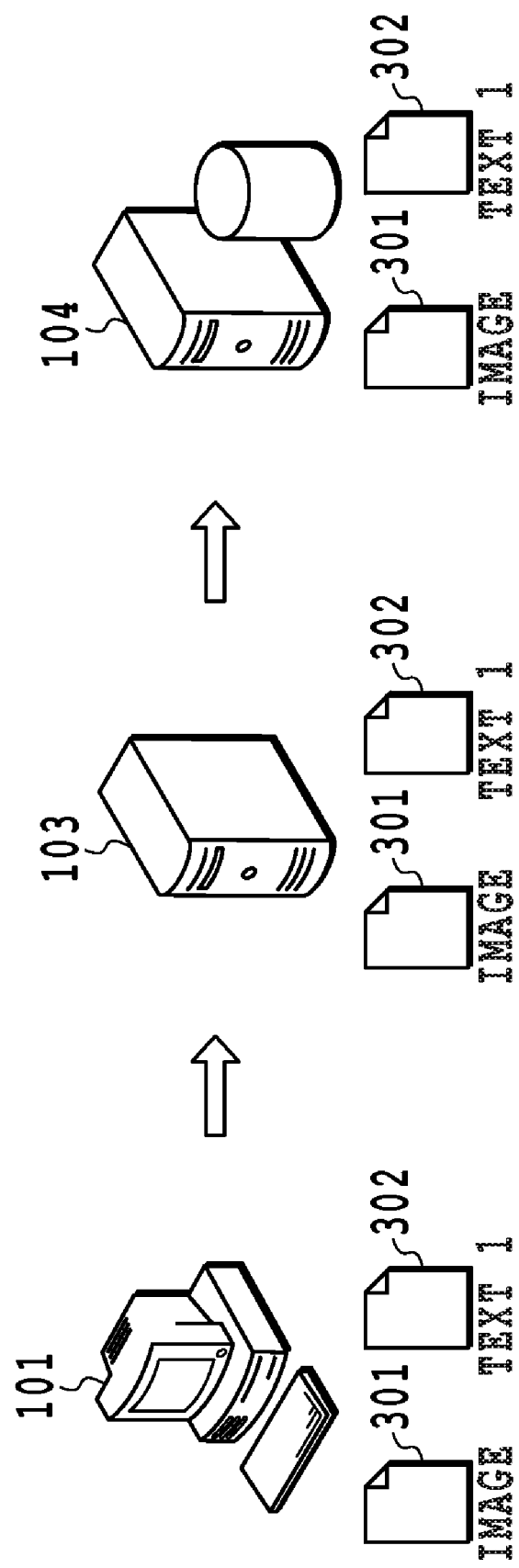
FIG. 4 is a diagram showing a flow of image data and text data individual processing units of FIG. 1 generate when not performing OCR processing.

FIG. 4, which is a diagram showing a flow of the image data and text data generated by the individual processing units described in detail in FIG. 1, is a diagram when the image processing server 103 does not carry out the OCR processing. The log information is not shown specifically.

As for the processing of the client PC 101, since it is the same as the processing of FIG. 3, the description thereof is omitted here. When the OCR necessity deciding unit 117 of the image processing server 103 makes a decision that the OCR processing is unnecessary for the image data, the OCR processing unit 118 is not executed. In this case, the text data 303 (text 2) of FIG. 3 is not generated. The data registration unit 120 registers the image data 301 and text data 302 (text 1) to the database server 104.

Since the OCR processing is not performed in the processing flow of FIG. 4, the registration performance for the job improves. In addition, that the text data database server 104 does not record redundant text data leads to the reduction in the disk capacity of the database server 104.

Figure 5:
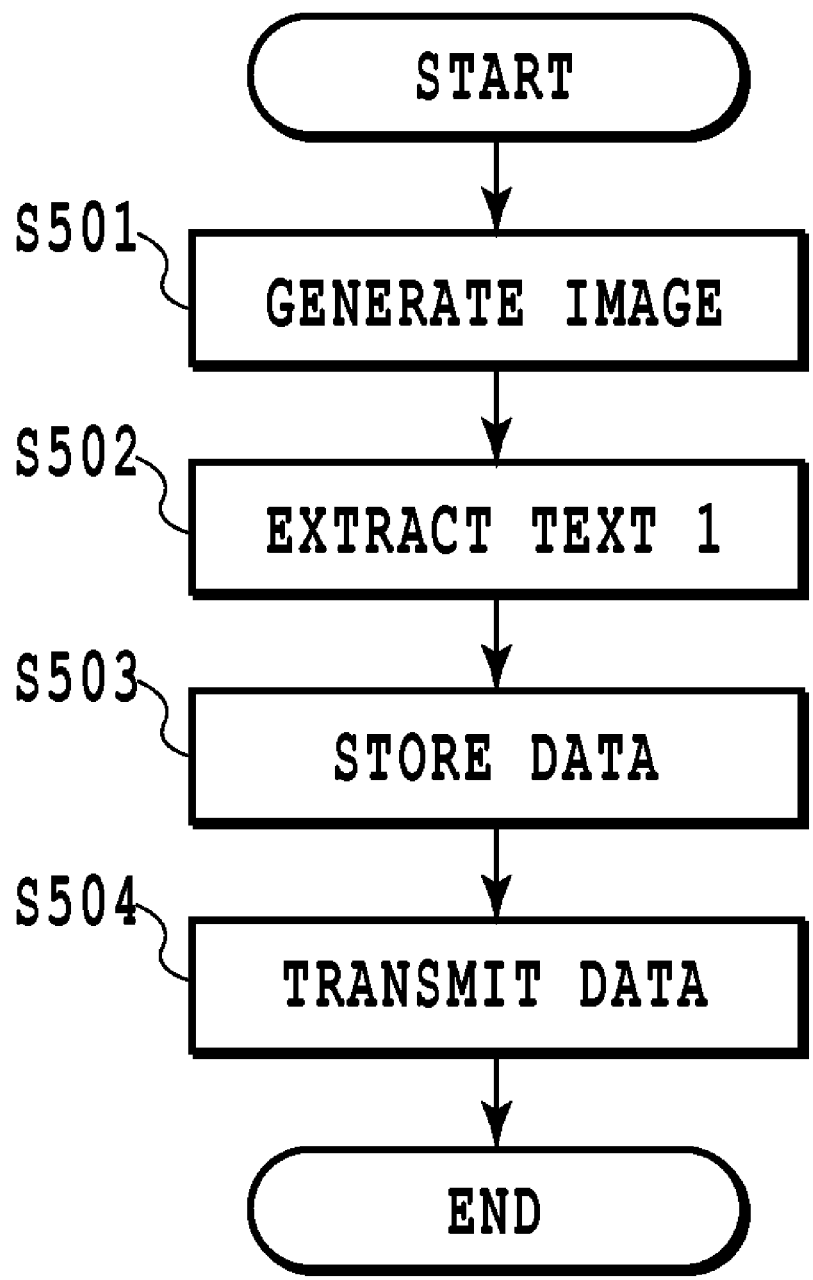
FIG. 5 is a flowchart illustrating a processing flow of individual processing units of a client PC 101 at the time of printing execution.

FIG. 5 is a flowchart of the individual processing units in the client PC 101 at the time of executing printing in the embodiment in accordance with the present invention. The description will be omitted here of the processing having no direct relation with the present invention such as a portion relating to actual paper output.

The processing steps shown in the flowchart of FIG. 5 are all executed by the CPU 201 shown in FIG. 2.

When a printing instruction is issued in response to the operation of a user, the image data extraction unit 109 generates the image data 301 based on the execution job (printing job) (step S501). The text data extraction unit 110 extracts the text data 302 (text 1) from the text drawing command of the execution job (printing job) (step S502). The data storing unit 113 stores the image data, text data and log data in the storage device 204 (step S503). The data transmitting unit 114 transmits the data stored in the storage device 204 to the image processing server 103 (step S504).

Figure 6:
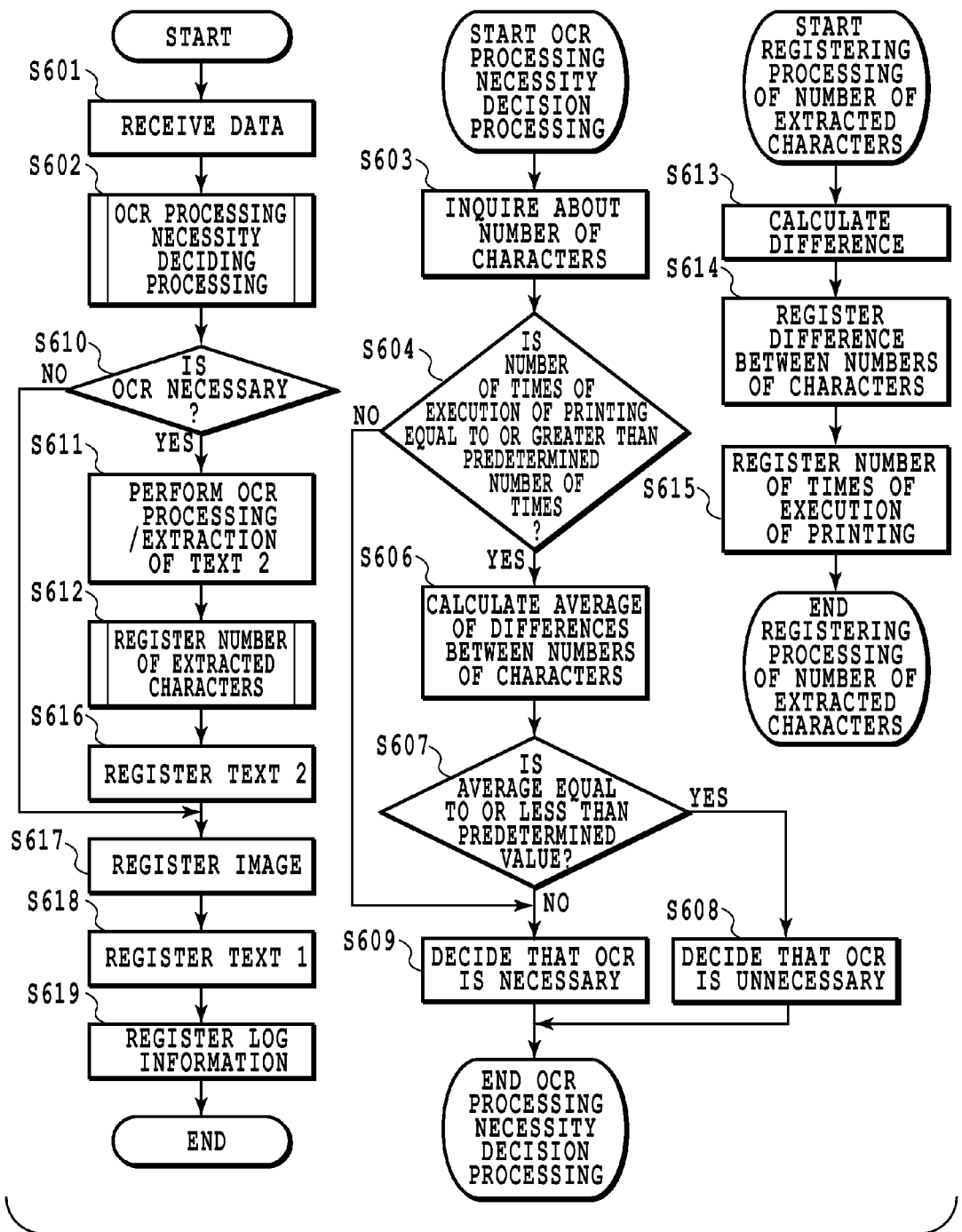
FIG. 6 is a flowchart illustrating a processing flow of individual processing units of an image processing server 103 at the time of printing execution.

FIG. 6 is a flowchart of the individual processing units in the image processing server 103 at the time of executing printing in the embodiment in accordance with the present invention. The description will be omitted here of the processing having no direct relation with the present invention such as the image converting processing necessary for storing to the data server.

The processing steps shown in the flowchart of FIG. 6 are all executed by the CPU 201 shown in FIG. 2.

The data receiving unit 115 of the image processing server 103 receives the data transmitted from the data transmitting unit 114 of the client PC 101 (step S601). The OCR necessity deciding unit 117 makes a decision as to whether it is necessary to apply the OCR processing to the image data 301 or not (step S602).

The processing at step S602 is shown at steps S603-S609 in more detail. The OCR necessity deciding unit 117 connects to the database server 104, and acquires "the sum total of the differences between the numbers of characters" and "the number of times of executing printing", which are decision data corresponding to the printing execution module name that creates the printing job (step S603). If "the number of times of executing printing" is less than a predetermined value (step S604), the OCR necessity deciding unit 117 decides that the OCR processing of the image data 301 is necessary, and the processing proceeds to step S609. If "the number of times of executing printing" is equal to or greater than the predetermined threshold (step S604), the OCR necessity deciding unit 117 calculates "the average of the differences between the numbers of characters" from "the sum total of the differences between the numbers of characters" and "the number of times of executing printing" (step S606). If the average value calculated is equal to or less than a predetermined threshold (step S607), the OCR necessity deciding unit decides that the OCR processing for the image data 301 is not necessary (step S608). In contrast, if the average value calculated is greater than the predetermined value (step S607), the OCR necessity deciding unit decides that the OCR processing for the image data 301 is necessary (step S609). Thus, according to the magnitude of the difference between the text data extracted from the text drawing command of the printing job processed previously and the text data obtained as an OCR result, the OCR necessity deciding unit decides on whether the OCR processing is necessary for a new printing job. Incidentally, as for the thresholds to be compared with "the number of times of executing printing" and "the average of the differences between the numbers of characters", they can be values recorded in advance in the system, or values the system administrator can set.

When the OCR necessity deciding unit 117 makes a decision that the OCR processing is necessary (step S610), the OCR processing unit 118 executes the OCR processing of the image data 301, and generates the text data 303 (text 2) (step S611). The number of characters registration unit 119 records the number of characters of the text data (step S612).

The processing at step S612 is shown at steps S613-S615 in more detail. The number of characters registration unit 119 counts the number of characters of the text data 302 (text 1) and that of the text data 303 (text 2), and calculates the absolute value of the difference between them (step S613). Then, the number of characters registration unit 119 registers the calculated value in connection with the printing execution module name of the job to the database server 104 (step S614). In addition, the number of characters registration unit 119 increments "the number of times of executing printing" of the printing execution module name by one (step S615).

The data registration unit 120 registers the text data 303 (text 2) to the database server 104 as text data for retrieving full text of the image data 301 (step S616). Then, the data registration unit 120 registers the image data 301 to the database server 104 (step S617). In addition, the data registration unit 120 also registers the text data 302 (text 1) to the database server 104 as text data for retrieving full text of the image data 301 (step S618). After that, the data registration unit 120 registers the log information in connection with the image data 301 to the database server 104 (step S619).

If the OCR necessity deciding unit 117 decides that the OCR processing is unnecessary (step S610), only the processing at step S617, step S618 and step S619 are performed without carrying out the processing from step S611 to step S616. The skipping of these steps of the processing will improve the performance.

Incidentally, according to the processing at step S604 in the flow described above, the OCR processing always takes place up to the predetermined number of times of executing printing. To avoid this, processing can be introduced which makes a decision earlier that the OCR processing is unnecessary in the case where it is possible to make a decision that the difference between the numbers of characters extracted in the processing at step S611 is very small.

In addition, at step S612, the difference can be divided by the greater number of characters between the text data 302 (text 1) and the text data 303 (text 2) rather than by the absolute value of the simple difference in the number of characters, which is expected to improve the accuracy.

Furthermore, at step S602 in the flow described above, even after the decision is once made that the OCR processing is unnecessary, the image processing server 103 always connects to the database server 104 to check the necessity of the OCR processing. To avoid this, the following processing can be carried out. When making the decision that the OCR processing is not necessary for the first time, the OCR necessity deciding unit 117 records the execution module name in the storage device 204 of the image processing server. After that, the job of the printing execution module checks the local storage device 204 without connecting to the database server 104. This makes it possible to improve the performance of the processing of confirming the necessity of the OCR processing.

The operation flow described above is only an example, and the present invention is not limited to the foregoing processing flow.

FIG. 7 shows a table (difference database) for storing the difference in the number of characters for each printing execution module name in the database server 104.

The table 701 is the main part of the table. An attribute name 702 includes from left to right attributes of "printing execution module name", "sum total of differences", and "number of times of executing printing". The column of "sum total of differences" records the sum total of the differences between the text data 302 (text 1) and the text data 303 (text 2) for the printing execution module name; and the column of "number of times of executing printing" records the number of times of executing printing for the printing execution module name. The field 703 is a field into which a value corresponding to the attribute name 702 is put.

In FIG. 7, attributes such as a main key are omitted. In addition, the style of the table is only an example, and the database is not necessarily limited to a relational database.

Embodiment 2

Figure 8:
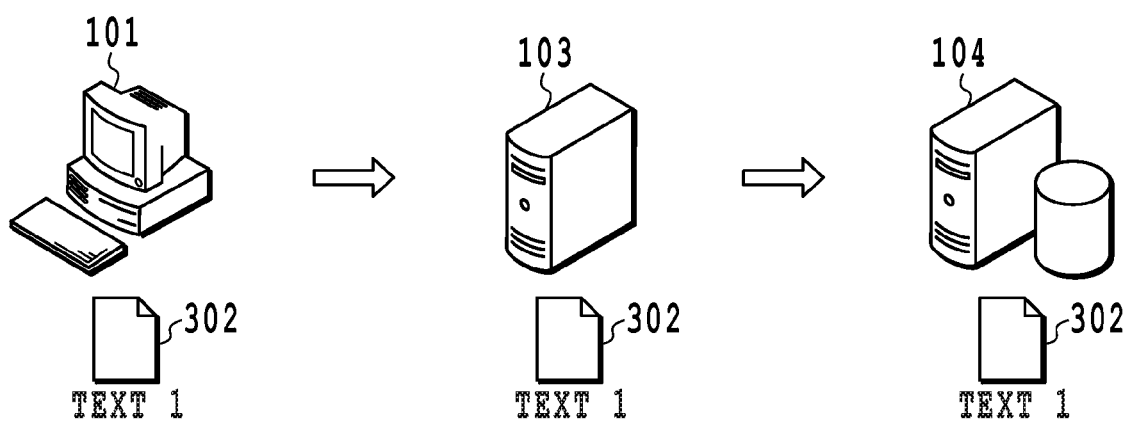
FIG. 8 is a diagram showing a flow of text data when image data 301 is not extracted in a second embodiment in accordance with the present invention.

FIG. 8 is a diagram showing a flow of the image data and the text data generated by the individual processing units of the second embodiment in accordance with the present invention. It shows an example that the client PC 101 does not extract the image data 301 when it makes a decision that the OCR processing is unnecessary. In FIG. 8, the description will be omitted of the components designated by the same reference numerals as those of their counterparts in FIG. 4 of the foregoing first embodiment.

In the flow described above with reference to FIG. 5 and FIG. 6, only the necessity of the OCR processing is switched according to the average value of the differences in the number of characters between the text data 302 (text 1) and the text data 303 (text 2). In the second embodiment, after deciding that the OCR processing is unnecessary, the image data extraction unit 109 stops extracting the image data 301. More specifically, the client PC 101 extracts only the text data 302 (text 1), and registers it to the database server 104 via the image processing server 103. This makes it possible to improve the performance because the transfer time and image processing time of the image data 301 are reduced, and to reduce the disk capacity of the database server 104.

Figure 9:
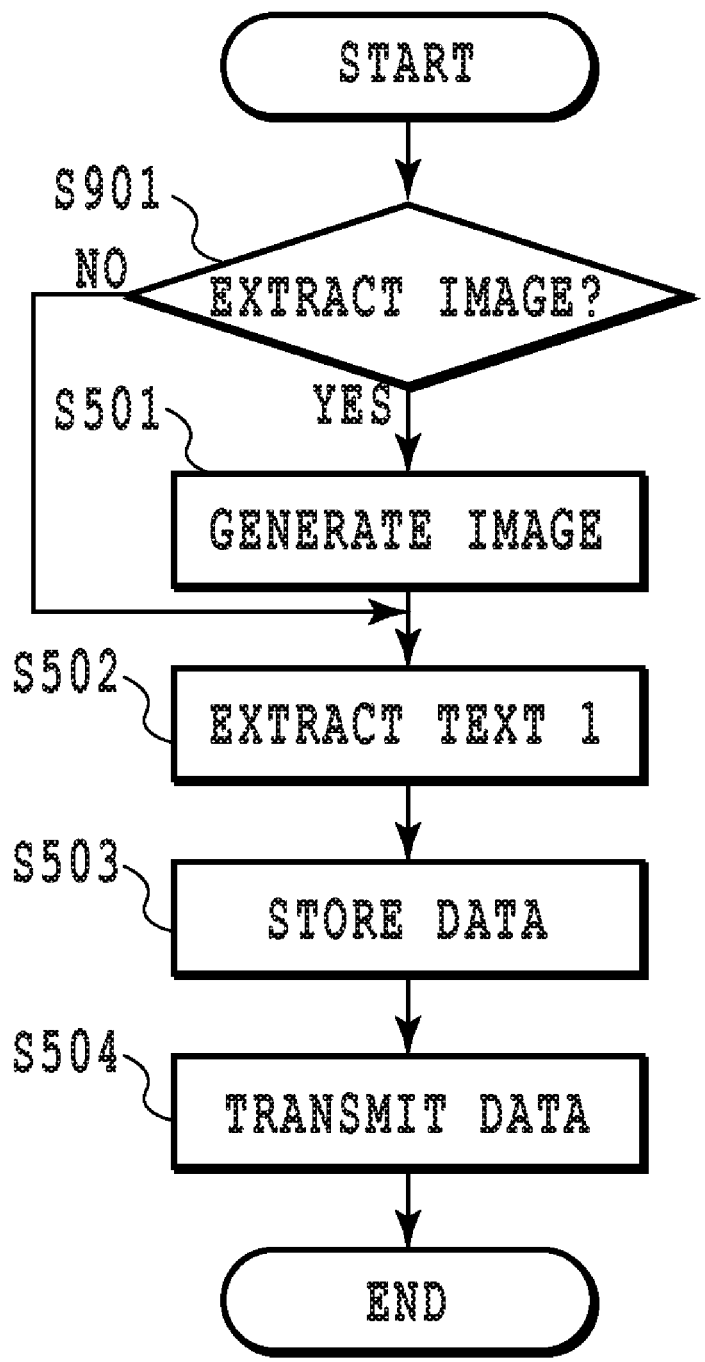
FIG. 9 is a flowchart illustrating a processing flow of the individual processing units of the client PC 101 at the time of printing execution in the second embodiment in accordance with the present invention.

FIG. 9 is a flowchart of the individual processing units of the client PC 101 at the time of printing execution in the second embodiment in accordance with the present invention. In FIG. 9, the description will be omitted of the components designated by the same reference numerals as those of their counterparts in FIG. 5 of the first embodiment.

The processing steps shown in the flowchart of FIG. 9 are all executed by the CPU 201 shown in FIG. 2.

When printing is executed, the image data extraction unit 109 checks its own storage device 204 as to whether to extract the image data 301 or not (step S901). If the extraction is not necessary, it does not extract the image data 301.

Figure 10:
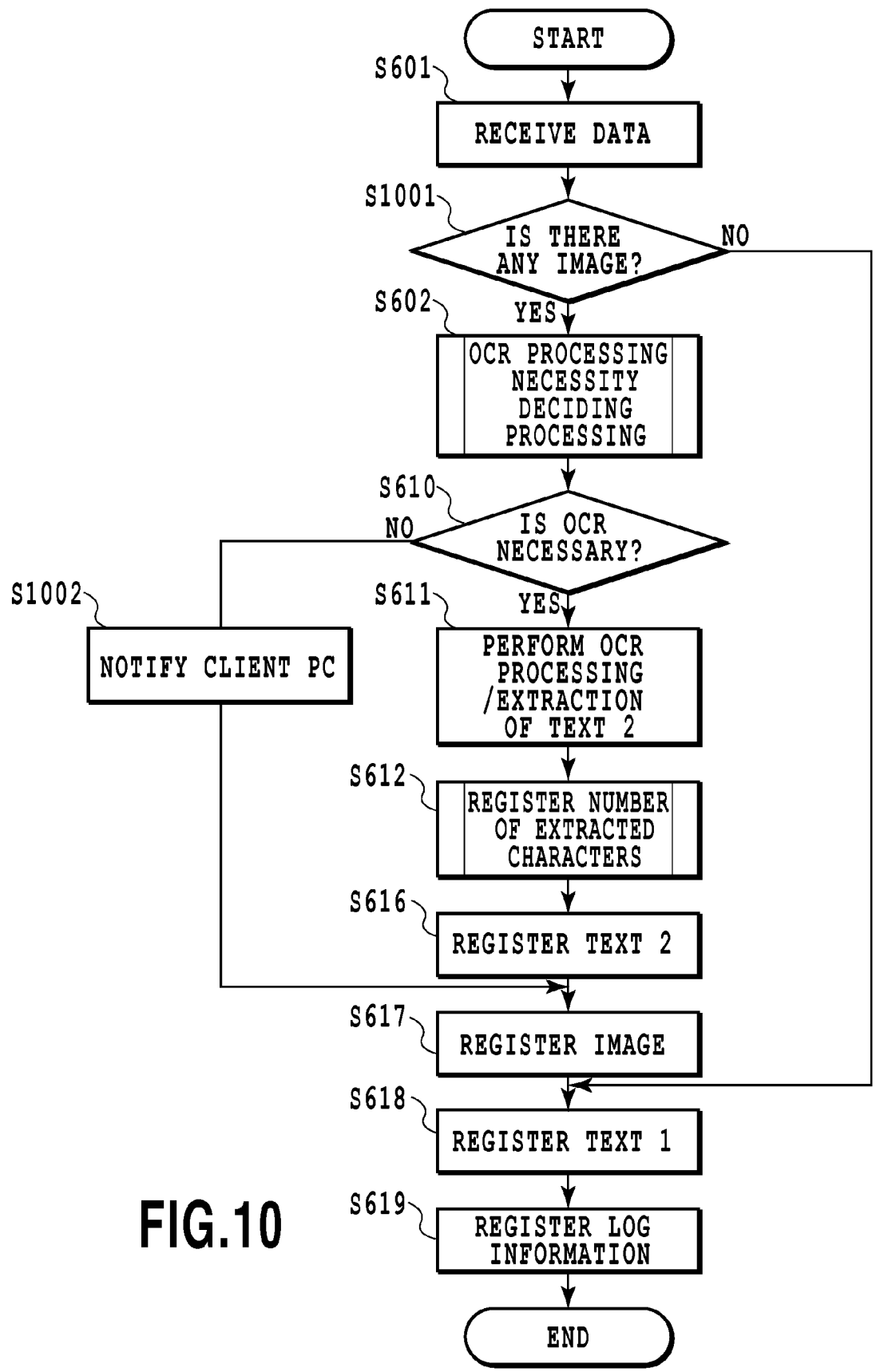
FIG. 10 is a flowchart illustrating a processing flow of the individual processing units of the image processing server 103 at the time of printing execution in the second embodiment in accordance with the present invention.

FIG. 10 is a flowchart of the individual processing units in the image processing server 103 at the time of executing printing in the second embodiment in accordance with the present invention. In FIG. 10, the description will be omitted of the components designated by the same reference numerals as those of their counterparts in FIG. 6 in the first embodiment.

The processing steps shown in the flowchart of FIG. 10 are all executed by the CPU 201 shown in FIG. 2.

In FIG. 10, the image conversion unit 116 checks whether the received data includes an image (step S1001). Unless the received data includes the image, the data registration unit 120 registers only the text data 302 (text 1) and log information to the database server 104.

At step S610, if it makes a decision that the OCR processing is unnecessary, the OCR necessity deciding unit 117 checks the printing execution module name of the job, and notifies the client PC 101 of it as the printing execution module name that does not require the extraction of the image data 301. As for the notification, instead of sending it to the client PC 101, the image processing server 103 can record the printing execution module name in its storage device 204, and the client PC 101 can inquire of the image processing server 103 about it regularly.

Incidentally, the operation flow described above is only an example, and the present invention is not limited to the foregoing processing flow.

Other Embodiments

The object of the present invention can be achieved by reading, from a storage medium that stores program code for implementing the procedures of the flowcharts shown in the foregoing embodiments, the program code and by executing it with a computer (CPU or MPU) of the system or apparatus. In this case, the program code itself read from the storage medium implements the functions (individual processing units) of the foregoing embodiments. Accordingly, the program code and the computer readable storage medium that records/stores the program code constitute the present invention as well.

As the storage medium for supplying the program code, a hard disk, an optical disk, a magneto-optical disk, a CD-ROM, a CD-R, a magnetic tape, a nonvolatile memory card, a ROM and the like can be used.

Besides, the present invention includes the case where an OS (operating system) and the like working on the computer according to the instructions of the program code performs part or all of the actual processing, and where the processing thus implements the functions of the foregoing embodiments. Furthermore, the functions of the foregoing embodiments can also be implemented by an expansion board inserted into a computer or by an expansion unit connected to a computer. In this case, the program code read out of the storage medium is written into a memory in the expansion board inserted to the computer or in the expansion unit connected to the computer; and after that, according to the instructions of the program code, the CPU or the like executes the processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-188639, filed Jul. 19, 2007, which is hereby incorporated by reference herein in its entirety.

What is claimed is:

1. An image processing server comprising:
   an OCR necessity deciding unit that makes a decision as to whether or not OCR processing is necessary for image data generated in accordance with drawing commands of a printing job;
   a first data registering unit that, when said OCR necessity deciding unit decides that OCR processing is unnecessary, registers text data extracted from a text drawing command of the printing job in a database, as text data for retrieving the image data;
   an OCR unit that, when said OCR necessity deciding unit decides that OCR processing is necessary, extracts text data by performing OCR processing on the image data generated in accordance with the drawing commands of the printing job; and
   a second data registering unit that, when said OCR necessity deciding unit decides that OCR processing is necessary, registers the text data extracted by said OCR unit and the text data extracted from the text drawing command of the printing job in the database, as text data for retrieving the image data, wherein
   said OCR necessity deciding unit makes a decision as to whether or not OCR processing is necessary for the image data generated in accordance with drawing commands of the printing job in accordance with a difference between (i) text data generated by performing OCR processing on an image generated based on a previous printing job processed previously and (ii) text data extracted from a text drawing command of the previous printing job processed previously.

2. The image processing server as claimed in claim 1, wherein said OCR necessity deciding unit makes a decision as to whether OCR processing is necessary for the image data generated in accordance with drawing commands of the printing job by using a difference database which stores a difference between (i) the text data generated by performing OCR processing on an image generated based on the previous printing job processed previously and (ii) the text data extracted from the text drawing command of the previous printing job processed previously in connection with a printing execution module name of the printing job processed previously.

3. The image processing server as claimed in claim 2, further comprising a difference storing unit that calculates an absolute value of a difference in the number of characters between (i) the text data generated by performing OCR processing on an image generated based on the previous printing job processed previously and (ii) the text data extracted from the text drawing command of the previous printing job processed previously, and stores the absolute value in the difference database in connection with the printing execution module name.

4. The image processing server as claimed in claim 1, wherein said OCR necessity deciding unit (i) makes a decision that OCR processing is necessary for the image data generated in accordance with drawing commands of the printing job, if a number of times that the printing job has been processed previously is less than a threshold; and
   (ii) if the number of times that the printing job has been processed previously is equal to or greater than the threshold, makes a decision as to whether or not OCR processing is necessary for the image data generated in accordance with drawing commands of the printing job in accordance with the difference between (i) the text data generated by performing OCR processing on an image generated based on the previous printing job processed previously and (ii) the text data extracted from the text drawing command of the previous printing job processed previously.

5. The image processing server as claimed in claim 1, wherein the text data extracted from the text drawing command of the printing job is text data extracted by a function of a printer driver.

6. The image processing server as claimed in claim 1, further comprising a receiving unit that receives image data generated in accordance with the drawing commands of the printing job and in accordance with the text data extracted from the text drawing command of the printing job, wherein
   said OCR necessity deciding unit makes a decision as to whether or not OCR processing is necessary for the image data of the printing job received.

7. An image processing method comprising:
- an OCR necessity deciding step of making a decision as to whether or not OCR processing is necessary for image data generated in accordance with drawing commands of a printing job;
- a first data registering step of, when the OCR necessity deciding step decides that OCR processing is unnecessary, registering text data extracted from a text drawing command of the printing job in a database as text data for retrieving the image data;
- an OCR step of, when said OCR necessity deciding step decides that OCR processing is necessary, extracting the text data by performing OCR processing on the image data generated in accordance with the drawing commands of the printing job; and
- a second data registering step of, when said OCR necessity deciding step decides that OCR processing is necessary, registering the text data extracted in said OCR step and the text data extracted from the text drawing command of the printing job in the database as the text data for retrieving the image data, wherein
- said OCR necessity deciding step makes a decision as to whether or not OCR processing is necessary for the image data generated in accordance with drawing commands of the printing job in accordance with a difference between (i) text data generated by performing OCR processing on an image generated based on a previous printing job processed previously and (ii) text data extracted from a text drawing command of the previous printing job processed previously,
- wherein if text data has not been previously generated by performing OCR processing on an image generated based on a previous printing job processed previously, then said OCR necessity unit decides that OCR processing is necessary for the image data generated in accordance with drawing commands of the printing job.

8. A non-transitory computer readable storage medium that stores a program for causing a computer to function as:
- an OCR necessity deciding unit that makes a decision as to whether or not OCR processing is necessary for image data generated in accordance with drawing commands of a printing job;
- a first data registering unit that, when said OCR necessity deciding unit decides that OCR processing is unnecessary, registers text data extracted from a text drawing command of the printing job in a database as text data for retrieving the image data;
- an OCR unit that, when said OCR necessity deciding unit decides that OCR processing is necessary, extracts text data by performing OCR processing on the image data generated in accordance with the drawing commands of the printing job; and
- second data registering unit that, when said OCR necessity deciding unit decides that OCR processing is necessary, registers the text data extracted by said OCR unit and the text data extracted from the text drawing command of the printing job in the database as the text data for retrieving the image data, wherein
- said OCR necessity deciding unit makes a decision as to whether or not OCR processing is necessary for the image data generated in accordance with drawing commands of the printing job in accordance with a difference between (i) text data generated by performing OCR processing on an image generated based on a previous printing job processed previously and (ii) text data extracted from the text drawing command of the previous printing job processed previously.

* * * * *